UNITED STATES PATENT OFFICE.

CHAS. PAYNE, OF SOUTH LAMBETH, ENGLAND.

IMPROVEMENT IN PROCESSES FOR PRESERVING WOOD.

Specification forming part of Letters Patent No. 7,399, dated May 28, 1850.

*To all whom it may concern:*

Be it known that I, CHARLES PAYNE, of South Lambeth, in the county of Surrey, chemist, a subject of the Queen of Great Britain, have invented or discovered new and useful Improvements in Preserving Vegetable Matters; and I, the said CHARLES PAYNE, do hereby declare that my invention relates to a mode of preserving vegetable matter by causing them to be impregnated with solutions of metallic or earthy matters, and then by chemical decomposition to obtain the preserving matters employed in an insoluble state within the substance of the vegetable matter treated when such effects are obtained by the combined processes of exhaustion, pressure, and chemical decomposition.

In order that my invention may be fully understood and readily carried into effect, I will proceed to explain the means pursued by me, first remarking that there are many metallic and earthy matters which are known as preservatives of vegetable matters from decay or from combustion by flame. It is not therefore my intention to enter into a particular description thereof, my invention relating to a mode of applying such matters as above stated, and not to the use or application of such preservative matters generally. I will therefore confine my explanation to the use of one metallic solution and one earthy matter in solution, together with the use of suitable matters in solution for decomposing the metallic or earthy matters used.

The wood or other vegetable matter to be preserved is placed in a strong vessel capable of bearing considerable pressure and of a size depending on the dimensions or quantity of the vegetable matters to be preserved at one time, and as good a vacuum is to be obtained as possible, either by air-pumps or otherwise, as is well understood, by which the air will be exhausted from the fibers of the vegetable matter. I next fill the vessel with the earthy or metallic solution I propose to use and allow the liquid to stand for a short time, or I nearly fill the vessel in the first instance with the liquor, and by the use of force-pumps or by columnal pressure I cause the liquor in the vessel to be pressed into the vegetable matter, and I find it desirable to withdraw a quantity of the liquor from time to time, keeping up the pressure of supply by which the process will be facilitated; and when the vegetable matter is well impregnated with the metallic or earthy solution—the time for doing which will vary with the nature and quantity and on the dimensions of the pieces of the vegetable matters treated; but the workman with a little practice will soon judge of the time required—and having saturated the vegetable matter in the vessel, I withdraw the liquor from the vessel and fill it with a solution suitable for decomposing the matter of the previous liquor by double or single decomposition, according to the result desired to be obtained, all which is well understood by chemists and will not be required to be described in this my specification.

Supposing the solution to be used to be a strong solution of sulphate of iron, either hot or cold, having impregnated the wood or other vegetable matter therewith, I apply a solution of any of the carbonated alkalies to decompose the solution of iron. I prefer carbonate of soda for that purpose; but any suitable known substances which will decompose the salt and render the oxide of iron insoluble may be resorted to, and by means of vacuum and pressure, as above explained, I cause the liquor to penetrate into the wood or other vegetable matter under process, and decomposition will follow.

In some cases it is desirable to dry or partially dry the wood between the processes of impregnation with the different liquors, in order to obtain the matters of the first solution in a more concentrated form within the substance of the wood, and thereby get rid of part of the aqueous matter therefrom, the same enabling us to facilitate the next process of impregnation and decomposition by exhaustion and pressure, as above explained. In this manner may other metallic solutions, particularly those of the cheaper metals, be used, employing proper means of decomposing the same, as above explained.

In respect to earthy matters, supposing a strong solution of alum to be used, I employ a solution of carbonate of soda of a strength proper for the solution of alum; or other proper and well-known means of decomposition of the solution of alum may be resorted to for precipitating the alumina, and thus rendering it insoluble in the substance of the wood or other vegetable matter treated, and in this manner may solutions of lime and other earthy matters be employed, using suitable decomposing substances in solution.

I am aware that wood and other vegetable matters have been before impregnated with various metallic and earthy matters; and I am also aware that it has been before proposed to use exhaustion and pressure to impregnate wood and other matters with preservative solutions, and I mention these in order to state that I do not claim the same when separately considered or when uncombined with a process of decomposition as above described; and I am also aware that chemical matters have been obtained in an insoluble state in the wood; but this has been effected simply by the process of absorption and immersion, the wood being successively soaked in the materials employed. This latter mode is not only slow, but very uncertain in its effects. In my improvements I not only make use of the processes of immersion and absorption, but in connection therewith I employ those of exhaustion and pressure, as hereinbefore specified.

I will now describe how by my invention wood or other vegetable matters may be impregnated with sulphur in a state of combination with other matters, or in the state of sulphur precipitated from previous combination.

I would at the outset state that sulphur, in whatever state of combination used, is to be combined with water as a means of impregnating wood and other vegetable matters with the sulphur; and in order more readily and effectively to cause such matters to enter wood or other vegetable matters, I cause the said wood or vegetable matter to be placed in suitable vessels, which may be exhausted of air, and afterward have the liquor containing sulphur pumped or forced in and act with considerable pressure, as is now extensively practiced and well understood when using other preservative materials. I employ any convenient sulphuret which is soluble in water, as the sulphuret of potassium, of sodium, or strontium; but I prefer sulphuret of barium or of calcium.

If I employ a solution of sulphuret of barium, I prepare it as follows: I mix together at the rate of sixteen pounds of powdered sulphate of barytes and from one to two or more pounds of powdered charcoal or coke, and I subject this mixture to the action of a strong red or to a white heat in a reverberatory furnace for about an hour. The sulphuret of barium thus obtained I dissolve in water by stirring small portions at a time into boiling water till the water ceases to dissolve it. The solution is afterward allowed to cool, and when cold water is added till the specific gravity is about 1.040. This solution is to be preserved for use out of contact of the air.

The wood or other vegetable matter to be impregnated is to be placed in a vessel, as above explained, and the air removed, which I prefer to do by first filling the vessel with steam and condensing it by injecting a portion of the solution to be employed into the vessel, and at the same time using jets of cold water externally. When a partial vacuum has been thus obtained I allow the solution to flow into the vessel, and I employ air-pumps to obtain as good a vacuum as possible, and then I pump in more of the solution and bring the pressure in the vessel from one hundred and ten to one hundred and forty pounds on the square inch, and allow the same to remain for about an hour, when the remaining liquor is drawn off. This being effected, I again obtain a vacuum and force in a second liquor in order to produce a single or double decomposition between it and that which has been previously forced into the wood or other vegetable matter; and the liquor I prefer to use for such purpose when for obtaining a double decomposition is a solution of sulphate of iron in water, and I prepare the solution to contain about one pound six ounces of the sulphate to each gallon of the solution. Other materials may be used for producing either double or single decomposition, as is well understood by chemists, the object of the invention being to obtain sulphur within the wood or other vegetable matter, and to cause it to remain therein either in the state of precipitated sulphur or sulphur in a state of combination with other matters, and so that when the sulphur has been caused to enter the wood it shall be rendered or become insoluble in water and not capable of being washed out thereby. Therefore I wish it to be understood that, although I have only described sulphuret of barium and the sulphuret of iron, I do not confine myself thereto; but I have given them as an example, they being, I believe, the best when cost and other circumstances are taken into consideration. Therefore

What I claim as my invention or improvement is—

The combination of the processes of immersion, absorption, exhaustion, pressure, and decomposition, substantially in the manner and for the purpose as hereinbefore explained.

CHAS. PAYNE.

Witnesses:
  JOHN ALCOCK,
    *Lincoln's Inn, London.*
  JOSEPH MARQUETTE,
    *Clerk in the Consulate U. States, London.*